(12) United States Patent
Stern

(10) Patent No.: US 11,544,685 B2
(45) Date of Patent: Jan. 3, 2023

(54) MULTIMEDIA KEEPSAKE SYSTEM AND METHOD

(71) Applicant: Geoffrey S. Stern, Westport, CT (US)

(72) Inventor: Geoffrey S. Stern, Westport, CT (US)

(*) Notice: Subject to any disclaimer, the term of this patent is extended or adjusted under 35 U.S.C. 154(b) by 42 days.

(21) Appl. No.: 14/457,321

(22) Filed: Aug. 12, 2014

(65) Prior Publication Data

US 2017/0330162 A1 Nov. 16, 2017

(51) Int. Cl.
| | | |
|---|---|---|
| *G06Q 20/12* | (2012.01) | |
| *G06F 3/16* | (2006.01) | |
| *H04N 21/218* | (2011.01) | |
| *H04N 21/258* | (2011.01) | |
| *G06Q 20/38* | (2012.01) | |
| *G10L 13/00* | (2006.01) | |
| *H04N 21/2743* | (2011.01) | |
| *H04N 21/61* | (2011.01) | |
| *H04N 21/854* | (2011.01) | |

(52) U.S. Cl.
CPC ......... *G06Q 20/1235* (2013.01); *G06F 3/165* (2013.01); *G06Q 20/387* (2013.01); *G10L 13/00* (2013.01); *H04N 21/218* (2013.01); *H04N 21/25875* (2013.01); *H04N 21/2743* (2013.01); *H04N 21/6125* (2013.01); *H04N 21/854* (2013.01)

(58) Field of Classification Search
CPC .............................. G06F 17/3089; G10L 21/06
See application file for complete search history.

(56) References Cited

U.S. PATENT DOCUMENTS

| | | | | |
|---|---|---|---|---|
| 6,292,780 B1* | 9/2001 | Doederlein | .......... | B42D 15/022 704/270 |
| 8,201,073 B2* | 6/2012 | Canora | ................ | G11B 27/034 715/201 |
| 8,589,488 B2* | 11/2013 | Huston | .............. | G06Q 30/0207 455/456.1 |
| 8,756,110 B2* | 6/2014 | Traina | ................ | G06Q 30/0637 705/26.1 |
| 8,811,794 B2* | 8/2014 | Traina | ................ | G06Q 30/0637 386/216 |
| 8,936,279 B1* | 1/2015 | Moroney | ........... | G06Q 30/0242 283/56 |
| 9,123,073 B2* | 9/2015 | Traina | ................ | G06Q 30/0637 |
| 2001/0005834 A1* | 6/2001 | Simpson | ................ | G11B 23/40 705/26.1 |
| 2003/0033305 A1* | 2/2003 | O'Connor | .............. | G06Q 30/02 |
| 2003/0050815 A1* | 3/2003 | Seigel | ................ | G06Q 30/0641 705/26.41 |
| 2003/0063716 A1* | 4/2003 | Turner | .................... | H04M 1/21 379/67.1 |
| 2003/0074266 A1* | 4/2003 | Lorber | .................. | G06Q 30/02 705/22 |
| 2005/0163291 A1* | 7/2005 | Turner | .................... | H04M 1/21 379/88.17 |

(Continued)

*Primary Examiner* — Michael N Opsasnick
(74) *Attorney, Agent, or Firm* — Tatonetti IP

(57) ABSTRACT

A multimedia keepsake is created containing multimedia content created by a customer and stored online as content information. After the customer selects the type of keepsake, the content information is converted to keepsake information having a format appropriate for storage in the selected type of keepsake. The keepsake information is stored online so as to be accessible via an access code, and it is downloaded to a vendor providing the access code.

16 Claims, 4 Drawing Sheets

(56) References Cited

U.S. PATENT DOCUMENTS

| | | | |
|---|---|---|---|
| 2006/0229940 A1* | 10/2006 | Grossman | G06Q 10/08 705/14.31 |
| 2007/0070831 A1* | 3/2007 | Schobben | G11B 19/10 369/30.32 |
| 2007/0105610 A1* | 5/2007 | Anderson | G07F 17/32 463/16 |
| 2007/0133876 A1* | 6/2007 | Chande | G06F 40/174 382/181 |
| 2007/0156502 A1* | 7/2007 | Bigvand | G06Q 30/02 705/26.1 |
| 2008/0101762 A1* | 5/2008 | Kellock | G11B 27/34 386/278 |
| 2010/0131573 A1* | 5/2010 | Reese | G06F 16/16 707/812 |
| 2010/0164836 A1* | 7/2010 | Liberatore | G06F 1/1647 345/1.1 |
| 2010/0250255 A1* | 9/2010 | Stern | H04N 1/00188 704/272 |
| 2010/0265535 A1* | 10/2010 | Friedman | G06Q 30/02 358/1.15 |
| 2011/0054906 A1* | 3/2011 | Stern | B42D 1/08 704/272 |
| 2013/0173713 A1* | 7/2013 | Anderson | G06Q 10/10 709/205 |
| 2013/0204865 A1* | 8/2013 | DeLuca | G06F 16/285 707/722 |
| 2014/0025591 A1* | 1/2014 | Villa, III | G06Q 10/10 705/312 |
| 2014/0080428 A1* | 3/2014 | Rhoads | H04W 4/70 455/88 |
| 2014/0136325 A1* | 5/2014 | Lewis | H04N 21/4325 705/14.53 |
| 2014/0200897 A1* | 7/2014 | Stern | G06F 1/1633 704/272 |

* cited by examiner

MULTIMEDIA KEEPSAKE SYSTEM AND METHOD

This patent application claims the benefit of the filing date of U.S. Provisional Patent Application No. 61/865,122, filed 12 Aug. 2013, the entirety of which is incorporated herein by reference.

FIELD OF THE INVENTION

The present invention relates to a personalized keepsake, a small electronic device, for use in association with gifts, audio books and greeting cards and marketing devices to selectively deliver a personalized multimedia recording from a keepsake provider, often a gift giver. The invention also relates to a method and system for producing the recorded multimedia keepsake in a commercial environment.

BACKGROUND OF THE INVENTION

In my U.S. Pat. Nos. 5,425,078, 5,490,206 and 5,570,414, I disclosed a voice message keepsake and a method and system for its recordation. The keepsake provided a message recorded by a keepsake provider, often a gift giver, which message might be part of a personalized greeting card or a personalization of a gift (e.g., flowers or a stuffed animal) sent by the gift giver to a remote recipient via a remote fulfillment vendor. The system permitted the gift giver to record his message remotely at a central location in association with a purchase code. The remote fulfillment vendor could then contact the central location remotely and, making use of the purchase code, download the recorded message and store it in a keepsake to be delivered to the recipient.

Although my original invention provided an unprecedented degree of personalization in the gift giving commerce of the time, it did require the central location to be specially equipped with communication links and equipment, not to mention the equipment to record the gift giver's voice. Moreover, each vendor had to have special equipment to store the gift giver's recorded message in the keepsake.

In later patents and patent applications, I disclosed keepsakes which enhanced a book, were part on an audio book or provided a video presentation. In time, keepsakes found use as devices to offer commercial presentations to an individual, as in promoting a pharmaceutical, a concert or movie, a real estate offering or financial services. Indeed, a keepsake is an ideal medium for customized offerings to an individual.

While voice message keepsakes are still very popular, today's technology makes it possible for a keepsake to be multimedia, including image and video displays. Moreover, modern technology makes it possible for a gift giver to have full control over the creation of content for the multimedia keepsake, either via a personal computer or a smart phone. It is an object of the present invention to provide a multimedia keepsake creation system which offers a gift giver essentially complete control over the content of the keepsake.

Moreover, modern online social media technology and platforms make it possible for a keepsake giver to easily access content for the multimedia keepsake that has been shared by or collaboratively created with friends or amateur artists wishing to share their creative content. Users of social media platforms post and share high volumes of user generated content (UGC) some of which is simply content such as music, images or video which the user curates or combines in a creative manner.

It is an object of the present invention to provide a multimedia keepsake creation system which offers a keepsake giver the ability to incorporate content from social media platforms and other sources into the content of the keepsake.

It is another object of the present invention to enable a keepsake giver to create content for a multimedia keepsake without regard to the particular type of keepsake he will be purchasing or the vendor who will be fulfilling the final purchase, whereby the gift giver will be able to create the content before choosing a keepsake product or fulfillment vendor.

In accordance with the present invention, a multimedia keepsake is created containing multimedia content created by a customer and stored online as content information. After the customer selects the type of keepsake, the content information is converted to keepsake information having a format appropriate for storage in the selected type of keepsake. The keepsake information is stored online so as to be accessible via an access code, and it is downloaded to a vendor providing the access code.

BRIEF DESCRIPTION OF THE DRAWINGS

The foregoing brief description, as well as further objects, features, and advantages of the present invention will be understood more completely from the following detailed description of presently preferred, but nonetheless illustrative, embodiment in accordance with the present invention, with reference being had to the accompanying drawings, in which.

DETAILED DESCRIPTION OF THE PREFERRED EMBODIMENT

Figure 1:
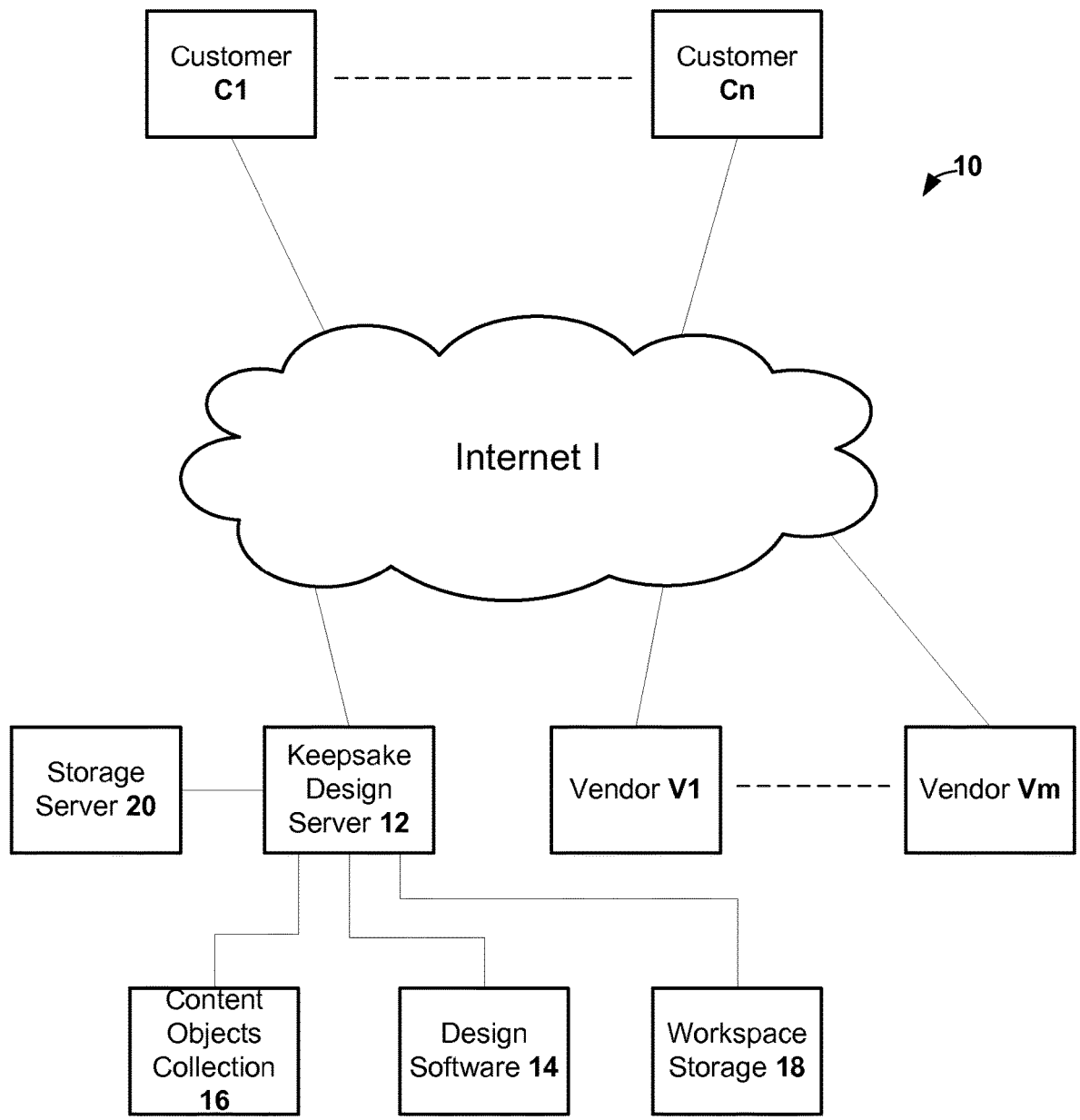
FIG. 1 is a block diagram illustrating a system 10 for creating multimedia keepsakes.

FIG. 1 is a block diagram illustrating a system 10 for creating multimedia keepsakes, which system embodies the present invention. A plurality of customers' computing devices C1 . . . Cn are connecting to a public network, such as the Internet I, as are a plurality of vendors' computing devices V1 . . . Vm. Typically, customers and vendors will be remote from each other. A computing device may be a personal computer, a smart phone, a PDA (personal digital assistant), tablet, e-reader, wearable computer or any other type of electronic device capable of Internet communication As this is a public network, any member of the public may be a customer or vendor. Also connected to network I is a Keepsake Server 12.

A user of server 12 becomes a customer or vendor by registering with the server. Server 12 has access to Design Software 14 and a collection of content objects 16 (e.g., stock sound and video clips, images and graphics) which it makes available for use by users. It will be appreciated that users can also create their own content, such as by recording voice or music, taking a photo or taking a video and/or downloading other content or published content from the Internet. The design software 14 enables a user to edit and combine objects into a presentation ultimately to be recorded in a multimedia keepsake. However, a user is not required to use software 14, as he may have his own software or prefer to use an online service. In any case, user originated (generated) content and user created presentations are stored in an area of a Workspace Storage 18 dedicated to the user.

It will be appreciated that a customer may create his presentation at any time, even before selecting a keepsake product or vendor. Once a keepsake product is selected, the customer may have server 12 create a keepsake file with the presentation in an appropriate format for that product. The keepsake file may also include control information to be used by a vendor's keepsake creation device. The keepsake file is stored in a storage server 20 in association with a unique Internet address. When that address is subsequently accessed, a qualified user will be able to download the keepsake file.

Figure 2:
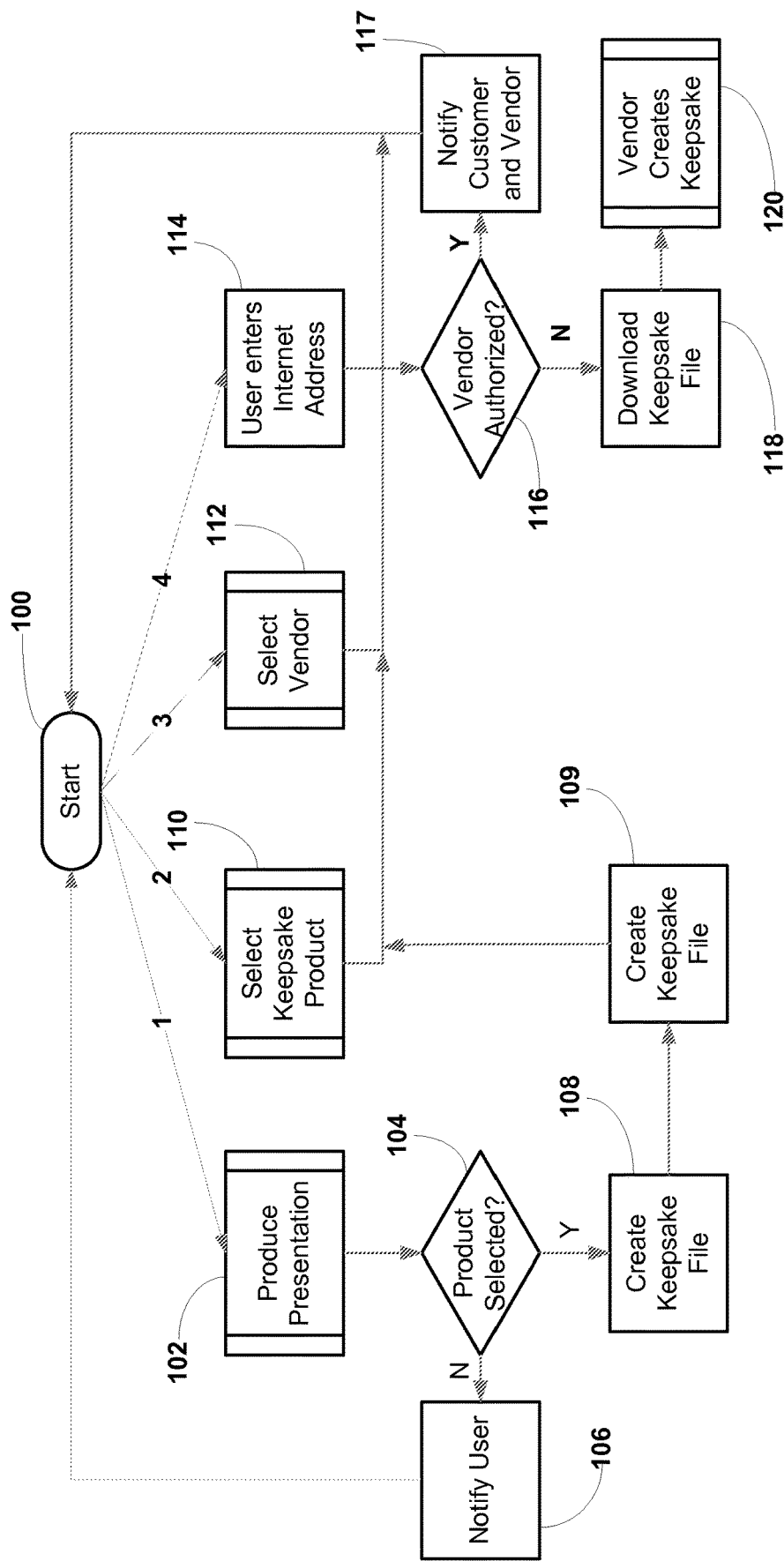
FIG. 2 is a flowchart of the overall process utilized in accordance with a preferred embodiment of the present invention which embodies the present invention.

FIG. 2 is a flowchart of the overall process utilized in accordance with a preferred embodiment of the present invention. It is assumed here that the user has already registered and qualified with Keepsake Server 12 and has signed on to it or may be signed in as a guest user. The process starts at block 100, where a user selects a branch, for example, from a pick list. If the user (a customer) selects branch 1, he will be able to produce and edit a presentation and place a keepsake file online. The presentation is produced in Produce Presentation routine 102, to be discussed further below. In routine 102, the user may either create/edit a presentation or request creation of a keepsake file. If he does not request creation of a keepsake file, control transfers to block 100. If he does, control transfers to block 104, where a test is performed to determine whether the user has selected a keepsake product. If the test at block 104 indicated that no keepsake device has been selected, a message is sent to the user at block 106 informing him that he must select a keepsake product, and control transfers to block 100. If the test at block 104 indicates that a keepsake product has been selected, control transfers to block 108, where an appropriate keepsake file is created and stored in storage server 20, in association with a unique Internet address. At block 109, the customer is then notified of the creation of the keepsake file and its internet address. It is contemplated that, as part of the notification, the internet address would be sent, for example, to the customer's smart phone in the form of a barcode, such as a three-dimensional QR code, which he can store and later display and scan from the screen of his smart phone. Control then reverts to block 100.

If the user selects branch 2, the select keepsake product routine 110 is started. In this routine, the user is able to select a desired keepsake product, preferably from a list, after which control reverts to block 100.

If the user selects branch 3, the select vendor routine 112 is started. In this routine, the user is able to authorize a desired vendor, preferably from a list, however, it is anticipated that a user will also be able to search for a vendor based on location and proximity to a fulfillment site or kiosk. Control then reverts to block 100.

If the user selects branch 4, control transfers to block 114, where the user enters the Internet address of a desired keepsake file. A test is then performed at block 116 to determine whether this user is a vendor authorized to access the file. If the result is negative, both this user and the customer who created the file are notified, at block 117, that this vendor tried to access the file but is not authorized, and control reverts to block 100. If the test at block 116 indicated that this user is authorized to access the keepsake file, control transfers to block 118, where the keepsake file is downloaded to the user, and control reverts to block 100.

At block 120, the vendor creates the recorded keepsake. He will do this by storing the content information from the keepsake file in the keepsake's internal memory or in a memory device, such as a micro SD chip, which may be plugged into the keepsake.

Figure 3:
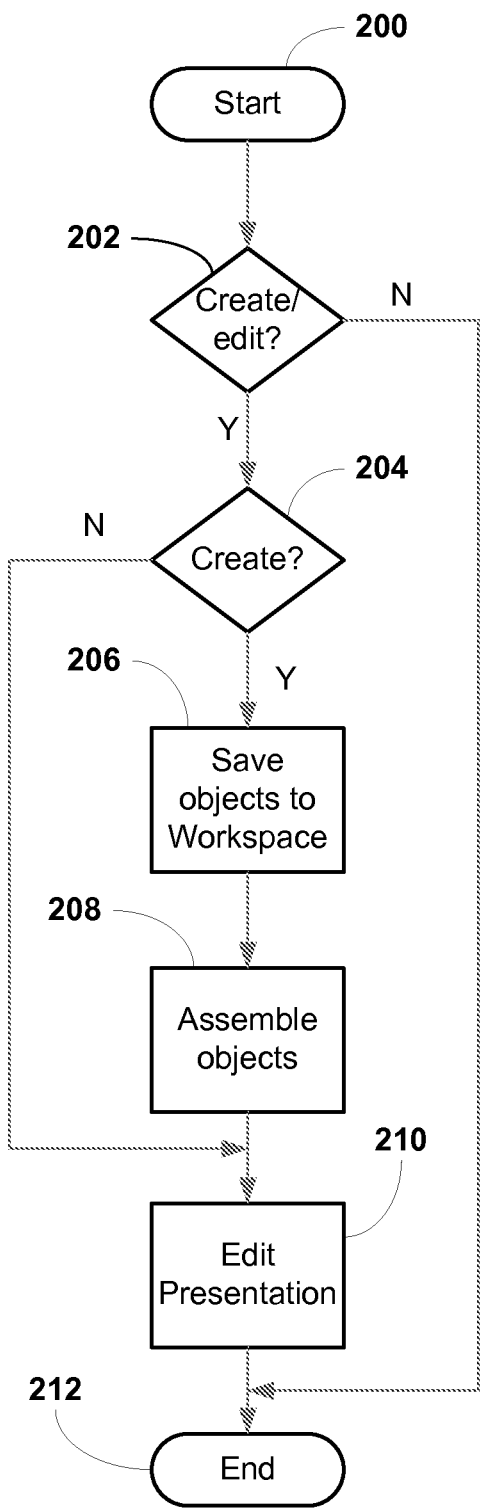
FIG. 3 is a flowchart illustrating a preferred form for procedure 102 "Produce Presentation"

FIG. 3 is a flowchart illustrating a preferred form for procedure 102 "Produce Presentation." The procedure starts at block 200 and at block 202, a test is performed to determine whether the user has requested creation or editing of the presentation and, if not, the routine ends at block 212, causing control to transfer to block 104. This permits creation of a keepsake file, for example, when the user has just selected a product. If the test at 202 indicates that the user is attempting to create or edit a presentation, a test is performed at block 204 to determine if the user is attempting to create a presentation. If not, control transfers to block 210, where the saved version of the presentation is retrieved and the user may edit the same. When he is finished, he saves the edited presentation. The routine then ends at block 212, causing control to transfer to block 104.

If the test at block 204 indicates that the user is trying to create a presentation, control transfers to block 206, where the user saves, to Workspace Storage 18, all of the content objects he intends to use for his presentation. This includes objects the user may have extracted from collection 16, and objects the user has uploaded and stored. At block 208, the user assembles the stored objects into a presentation, making use of Design Software 14, and he saves the presentation in his Workspace. Control then transfers to block 210, where the user edits the presentation and saves the edited version. The routine then ends at block 212, causing control to transfer to block 104. It will be appreciated that, alternately, the user may create the presentation offline or making use of online services and save the completed presentation in his Workspace.

In some instances, a customer may not have his keepsake created by a remote vendor but may do so on the vendor's premises. The customer need merely display the QR code for his keepsake file and have it scanned in on the vendor's premises, where the keepsake is loaded with the content information stored on the Internet.

My latest embodiment of a keepsake is electronic. A website is provided which can be accessed by a user where he can create a keepsake in the form of a dedicated audio performance, for example, a popular song. The performance is dedicated by incorporating a personal voice message. The dedicated performance becomes a keepsake when the user sends it to a recipient. Preferably, an application is provided for an Android device, such as a smart phone, which permits convenient communication with the website.

Figure 4:
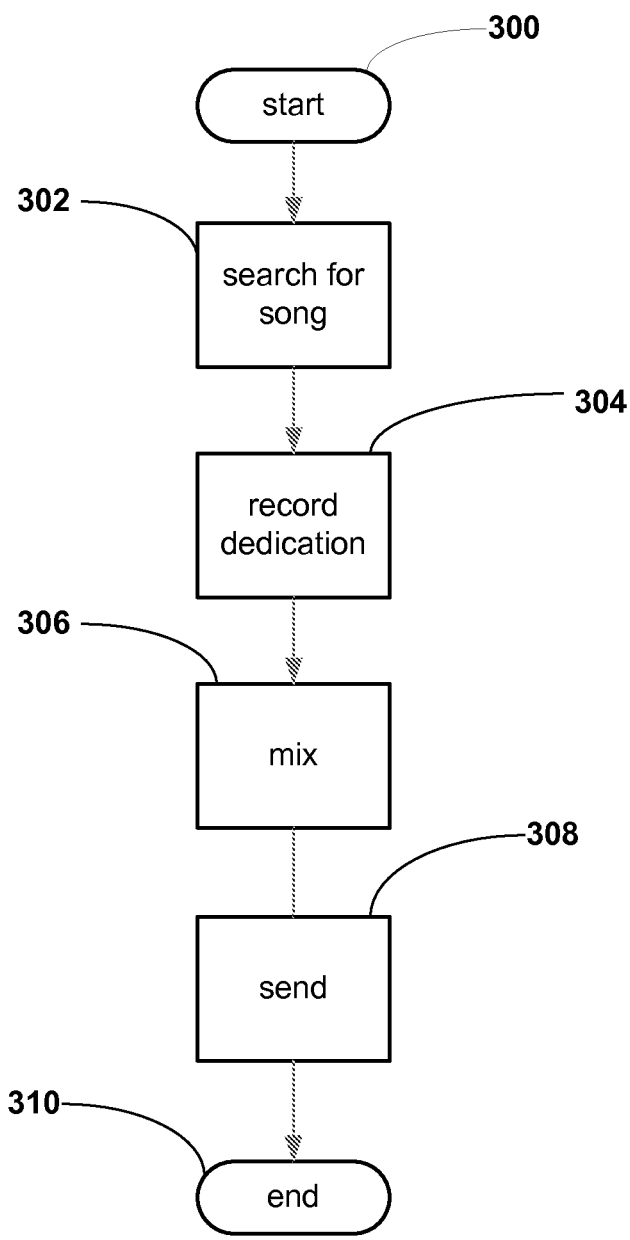
FIG. 4 is a flowchart illustrating the operation of the website.

FIG. 4 is a flowchart illustrating the operation of the website. The process begins at block 300 and, at block 302, the user searches for a performance, such as a song to be gifted. Preferably, the website will have access to thousands of songs. When the user selects a song, the website reserves it as his gift. At block 304, the user records his voice dedication. At block 306, the dedication is mixed with the song, after which the dedicated song is sent to the recipient as a keepsake at block 308. It could for example be sent as an email. The process then ends at block 310.

Although a preferred embodiments of the invention have been disclosed for illustrative purposes, those skilled in the art will appreciate that many additions, modifications, and substitutions are possible, without departing from the scope and spirit of the invention as defined by the accompanying claims.

I claim:

1. A system adapted to enable users to create multimedia keepsake files for future undefined integration with keepsake products, comprising:
    user computing devices having network connectivity to access a remote keepsake service;
    the remote keepsake service configured to store created multimedia keepsake files, and
    one or more remote vendor services respectively associated with vendors, the remote vendor services configured to access the created multimedia keepsake files stored at the remote keepsake service for integration into the keepsake products, in which each remote vendor service hosts its own subset of available keepsake products into which the multimedia keepsake files are integrateable, wherein the one or more remote vendor services operate distinctly from the remote keepsake service,
    wherein the system is configured to:
        create, at a user computing device communicating with the remote keepsake service, a multimedia keepsake file at the remote keepsake service that is distinct from the one or more remote vendor services, wherein the multimedia keepsake file is created independent of any remote vendor service and keepsake product, and wherein the created multimedia keepsake is created before a user associated with the user computing device selects any vendor or keepsake product;
        store, at the remote keepsake service, the created multimedia keepsake file;
        associate, at the remote keepsake service, the created multimedia keepsake file with a unique internet address to enable future access and future use of the multimedia keepsake file, in which the future access and future use occurs upon the user computing device accessing one of the one or more remote vendor services;
        search, by the user computing device, through a list of vendors associated with the one or more remote vendor services, in order to integrate the created multimedia keepsake file with an available keepsake product hosted by a respective remote vendor service;
        select, by the user computing device, a vendor associated with a remote vendor service of the one or more remote vendor services;
        authorize, by the user computing device, the selected vendor's remote vendor service to download the created multimedia keepsake file, authorization being provided by supplying the vendor with the unique internet address for the created multimedia keepsake file;
        download, by the remote vendor service associated with the selected vendor, the created multimedia keepsake file using the unique internet address; and
        create, by the remote vendor service associated with the selected vendor, a keepsake product using the created multimedia keepsake file, in which creating the keepsake product includes integrating the created multimedia keepsake file into the keepsake product.

2. The system of claim 1, wherein the internet address is a QR (quick response) code.

3. The system of claim 1, wherein access to the multimedia keepsake file is denied to vendors who enter an incorrect internet address.

4. The system of claim 1, wherein the remote vendor service integrates the created multimedia keepsake file into a memory card that is inserted into the keepsake product for execution.

5. The system of claim 1, wherein the system is configured to:
    select, by the user computing device, a second vendor associated with a second remote vendor service of the one or more remote vendor services, in which the second vendor is different from an originally selected one;
    authorize, by the user computing device, the selected second vendor's remote vendor service to download the created multimedia keepsake file, authorization being provided by supplying the second vendor with the unique internet address for the created multimedia keepsake file;
    download, by the second remote vendor service associated with the selected second vendor, the created multimedia keepsake file using the unique internet address; and
    create, by the second remote vendor service associated with the selected second vendor, a second keepsake product using the created multimedia keepsake file, in which creating the second keepsake product includes integrating the created multimedia keepsake file into the second keepsake product,
    wherein the second keepsake product is distinct from an originally created one, and each created keepsake product uses a same multimedia keepsake file.

6. The system of claim 5, wherein the remote vendor service is remote from the remote keepsake service, but the remote vendor service is local to the user computing device.

7. The system of claim 6, wherein the second remote vendor service is remote and independent from the remote keepsake service, but the second remote vendor service is local to the user computing device, and wherein the originally selected remote vendor service and the second remote vendor service are independent and distinct to each other.

8. The system of claim 7, wherein the list of vendors are provided to the user computing device based on the user computing device's proximity to vendors.

9. A method adapted to enable users to create multimedia keepsake files for future undefined integration with keepsake products, comprising:
    creating, at a user computing device communicating with the remote keepsake service, a multimedia keepsake file at the remote keepsake service that is distinct from the one or more remote vendor services, wherein the multimedia keepsake file is created independent of any remote vendor service and keepsake product, and wherein the created multimedia keepsake is created before a user associated with the user computing device selects any vendor or keepsake product;
    storing, at the remote keepsake service, the created multimedia keepsake file;
    associating, at the remote keepsake service, the created multimedia keepsake file with a unique internet address to enable future access and future use of the multimedia keepsake file, in which the future access and future use occurs upon the user computing device accessing one of the one or more remote vendor services;
    searching, by the user computing device, through a list of vendors associated with the one or more remote vendor services, in order to integrate the created multimedia keepsake file with an available keepsake product hosted by a respective remote vendor service;

selecting, by the user computing device, a vendor associated with a remote vendor service of the one or more remote vendor services;

authorizing, by the user computing device, the selected vendor's remote vendor service to download the created multimedia keepsake file, authorization being provided by supplying the vendor with the unique internet address for the created multimedia keepsake file;

downloading, by the remote vendor service associated with the selected vendor, the created multimedia keepsake file using the unique internet address; and creating, by the remote vendor service associated with the selected vendor, a keepsake product using the created multimedia keepsake file, in which creating the keepsake product includes integrating the created multimedia keepsake file into the keepsake product.

10. The method of claim 9, wherein the internet address is a QR (quick response) code.

11. The method of claim 9, wherein access to the multimedia keepsake file is denied to vendors who enter an incorrect internet address.

12. The method of claim 9, wherein the remote vendor service integrates the created multimedia keepsake file into a memory card that is inserted into the keepsake product for execution.

13. The method of claim 9, wherein the system is configured to:

select, by the user computing device, a second vendor associated with a second remote vendor service of the one or more remote vendor services, in which the second vendor is different from an originally selected one;

authorize, by the user computing device, the selected second vendor's remote vendor service to download the created multimedia keepsake file, authorization being provided by supplying the second vendor with the unique internet address for the created multimedia keepsake file;

download, by the second remote vendor service associated with the selected second vendor, the created multimedia keepsake file using the unique internet address; and create, by the second remote vendor service associated with the selected second vendor, a second keepsake product using the created multimedia keepsake file, in which creating the second keepsake product includes integrating the created multimedia keepsake file into the second keepsake product, wherein the second keepsake product is distinct from an originally created one, and each created keepsake product uses a same multimedia keepsake file.

14. The method of claim 13, wherein the remote vendor service is remote from the remote keepsake service, but the remote vendor service is local to the user computing device.

15. The method of claim 14, wherein the second remote vendor service is remote and independent from the remote keepsake service, but the second remote vendor service is local to the user computing device, and wherein the originally selected remote vendor service and the second remote vendor service are independent and distinct to each other.

16. The method of claim 15, wherein the list of vendors are provided to the user computing device based on the user computing device's proximity to vendors.

* * * * *